United States Patent [19]

Yuyama et al.

[11] 4,382,983
[45] May 10, 1983

[54] METHOD FOR THE FORMATION OF ABRASION-RESISTANT COATING FILM

[75] Inventors: Masahiro Yuyama; Mikio Futagami, both of Niihama, Japan

[73] Assignee: Sumitomo Chemical Company, Limited, Osaka, Japan

[21] Appl. No.: 283,784

[22] Filed: Jul. 15, 1981

[30] Foreign Application Priority Data

Jul. 24, 1980 [JP] Japan .................. 55/102187
Jul. 24, 1980 [JP] Japan .................. 55/102188
Jul. 24, 1980 [JP] Japan .................. 55/102189

[51] Int. Cl.³ .............................................. B05D 3/02
[52] U.S. Cl. ................................. 427/386; 427/164; 427/387; 427/388.2; 427/388.5; 428/447; 428/450; 428/451; 528/14
[58] Field of Search ................ 427/386, 388.2, 388.3, 427/387, 388.5, 164, 421, 428, 429, 430.1, 435; 528/14, 12, 23, 21; 106/287.14, 287.15, 287.16; 428/447, 450, 451; 252/410, 431 R, 431 N, 431 C, 431 L

[56] References Cited

U.S. PATENT DOCUMENTS

2,440,711 5/1943 Bechtold .
3,451,838 6/1969 Burzynski et al. .
3,962,189 6/1976 Russin et al. ................ 252/431 R
4,026,720 5/1977 Ikeda ............................ 528/14 X
4,026,826 5/1977 Yoshida et al. .............. 528/14 X
4,049,861 9/1977 Nozari ......................... 528/14 X
4,294,950 10/1981 Kato ............................... 528/14

FOREIGN PATENT DOCUMENTS

48-26822 4/1973 Japan .
48-56230 8/1973 Japan .
52-68231 6/1977 Japan .

*Primary Examiner*—Thurman K. Page
*Attorney, Agent, or Firm*—Birch, Stewart, Kolasch & Birch

[57] ABSTRACT

In a method for forming an abrasion-resistant coating film by heat-curing a coating composition composed mainly of a partially hydrolyzed product of alkoxysilane represented by the formula:

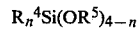

$$R_n^4Si(OR^5)_{4-n}$$

wherein n is an integer of 0 to 2; $R^4$ is alkyl having 1 to 6 carbon atoms, phenyl, allyl, vinyl, methacryloxy, methacryloxyalkyl, mercaptoalkyl, aminoalkyl, epoxyalkyl, epoxyalkyloxy, epoxyalkyloxyalkyl, tetrahydrofuryl or fluoroalkyl; and $R^5$ is alkyl having 1 to 4 carbon atoms, an improvement comprises using as a curing catalyst one or more compounds selected from the group consisting of alkali metal salts of thio-acid, dithio-acid and their derivatives; barbituric acid and its derivatives; and β-dicarbonyl compound.

4 Claims, No Drawings

METHOD FOR THE FORMATION OF ABRASION-RESISTANT COATING FILM

The present invention relates to a method for the formation of an abrasion-resistant coating film. More particularly, it relates to a curing catalyst useful in the formation of an abrasion-resistant coating film by applying a polysiloxane coating composition to the surface of a substrate such as a plastic article, a metallic article or the like, and then heat-curing.

Generally, plastic moldings, for example, those made of thermoplastic resins such as polymethyl methacrylate, polystyrene, methyl methacrylate/styrene copolymers, acrylonitrile/styrene copolymers, polycarbonates, vinyl chloride resins and ABS resins have excellent properties such as lightweight properties, easy processability and good impact resistance. However, on the other hand, they are liable to be easily scratched because of the softness of their surfaces, and to be easily swollen and dissolved by contacting them with a solvent. Further, the surfaces of low-hardness metals such as aluminum, and the surfaces of plastics and metals coated with paints are easily injured by rubbing with steel wool or sand and they are also injured during use and hence they lose luster.

In order to eliminate these drawbacks, many improvements have been proposed. For example, a method comprising coating a composition composed mainly of a hydrolyzed product of tetraalkoxysilane and an organic polymer (U.S. Pat. No. 2,440,711) and a method comprising coating a composition composed mainly of a hydrolyzed product of alkyltrialkoxysilane (U.S. Pat. No. 3,451,838) have been proposed. In the use of such composition, however, the curing temperature is generally so high (120° C.-170° C.) that, on processing of a thermoplastic resin, the molding is deformed, and also that, on curing at a relatively low temperature below the heat distortion temperature of the resin, a long curing time is needed and the surface hardness becomes insufficient.

Further, there are many patent applications which disclose as methods for eliminating the above drawbacks low-temperature curing processes using curing catalysts. For example, Japanese Patent Publication (Kokai) Nos. 26822/1973 and 56230/1973 disclose addition of an alkali metal salt of a thiocyanic acid or an organic carboxylic acid to a hydrolyzed product of tetraalkoxysilane and alkyltrialkoxysilane. Japanese Patent Publication (Kokai) No. 68231/1977 discloses addition of an alkali metal borate to a composition composed mainly of a hydrolyzed product of alkoxysilane. According to these methods, curing can be carried out at a relatively low temperature and within a relatively short time. However these methods still have some drawbacks such as blushing of a coating surface, relatively short pot life of a coating composition and low solubility of a catalyst in a solution of a hydrolyzed product of alkoxysilane which limits the amount of the catalyst.

One object of the present invention is to provide an improved method for the formation of an abrasion-resistant coating film. Another object of the present invention is to provide a curing catalyst suitable for practical use in the formation of an abrasion resistant coating film. These objects as well as other objects and advantages of the present invention will become apparent to those skilled in the art from the following description.

According to the present invention, there is provided an improvement in a method for forming an abrasion-resistant coating film by heat-curing a coating composition composed mainly of a partially hydrolyzed product of alkoxysilane represented by the formula:

$$R_n^4 Si(OR^5)_{4-n}$$

wherein n is an integer of 0 to 2; $R^4$ is alkyl having 1 to 6 carbon atoms, phenyl, allyl, vinyl, methacryloxy, methacryloxyalkyl, mercaptoalkyl, aminoalkyl, epoxyalkyl, epoxyalkyloxy, epoxyalkyloxyalkyl, tetrahydrofuryl or fluoroalkyl; and $R^5$ is alkyl having 1 to 4 carbon atoms. The improvement comprises using as a curing catalyst at least one alkali metal salt selected from the group consisting of (A) alkali metal salts of thio-acids, dithio-acids and their derivatives represented by the formula:

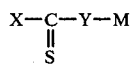

$$\begin{array}{c} X-C-Y-M \\ \parallel \\ S \end{array}$$

wherein X is $-NR^1R^2$ or $R^3$; $R^1$ and $R^2$ are each hydrogen, alkyl having 1 to 4 carbon atoms, phenyl, benzyl or allyl; $R^3$ is hydrogen, alkyl having 1 to 4 carbon atoms, phenyl, benzyl or alkoxy having 1 to 6 carbon atoms; Y is oxygen or sulfur; and M is lithium, sodium or potassium;

(B) alkali metal salts of barbituric acid and their derivatives represented by the formula:

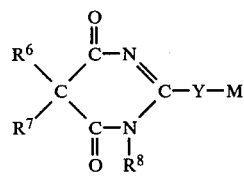

wherein $R^6$ and $R^7$ are each hydrogen, alkyl having 1 to 5 carbon atoms, phenyl, benzyl, allyl or cyclohexyl; $R^8$ is hydrogen or methyl; Y is oxygen or sulfur and M is lithium, sodium or potassium; and (C) alkali metal salts of a β-dicarbonyl compound represented by the formula:

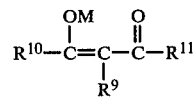

wherein $R^9$ is hydrogen, alkyl having 1 to 4 carbon atoms or alkylene having 3 to 4 carbon atoms; $R^{10}$ and $R^{11}$ are each alkyl having 1 to 4 carbon atoms, alkoxy having 1 to 4 carbon atoms, alkoxycarbonyl having 2 to 5 carbon atoms, phenyl, benzyl or alkylene having 3 or 4 carbon atoms; and M is lithium, sodium or potassium.

The alkoxysilane used in the present invention includes a tetraalkoxysilane and/or an organic alkoxysilane represented by the formula:

$$R_n^4 Si(OR^5)_{4-n}$$

wherein n is an integer of 0 to 2; $R^4$ is alkyl having 1 to 6 carbon atoms, phenyl, allyl, vinyl, methacryloxy or tetrahydrofuryl or methacryloxyalkyl, mercaptoalkyl, aminoalkyl, epoxyalkyl, epoxyalkyloxy, epoxyalkyloxyalkyl or fluoroalkyl (said alkyl or alkyloxy preferably has 1 to 4 carbon atoms); and $R^5$ is alkyl having 1 to 4 carbon atoms.

The partially hydrolyzed product of the alkoxysilane can be generally obtained by a well-known method, for example, by adding water to an alcohol solution of the alkoxysilane, the amount of water being not less than 0.5 time by mole as much as the total mole of the alkoxysilane, and then hydrolyzing in the presence of an acid. In some cases, the partially hydrolyzed product may also be obtained by directly hydrolyzing a chlorosilane such as $R_n^4SiCl_{4-n}$. The hydrolyzed product can be used alone or in the combination of two or more thereof. Alternatively, two or more alkoxysilanes can be mixed and partially co-hydrolyzed.

The curing catalyst used in the present invention includes the following alkali metal salts:

(A) the alkali metal salts of thio-acid, dithio-acid and their derivatives represented by the formula:

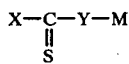

wherein X, Y and M are as defined above;

(B) the alkali metal salts of barbituric acid and its derivatives represented by the formula:

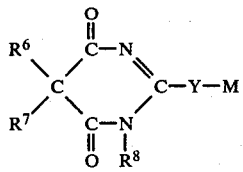

wherein $R^6$, $R^7$, $R^8$, Y and M are as defined above; and (C) the alkali metal salt of a $\beta$-dicarbonyl compound represented by the formula:

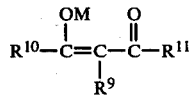

wherein $R^9$, $R^{10}$ and $R^{11}$ are as defined above.

Examples of the curing catalyst used in the present invention are one or more alkali metal salts selected from the lithium, sodium and potassium salts of thiocarbamic acid derivatives such as thiocarbamic acid, methylthiocarbamic acid, ethylthiocarbamic acid and phenylthiocarbamic acid; thiocarboxylic acid derivatives such as thioformic acid, thioacetic acid, thiobenzoic acid and thiocarbonic acid; dithiocarbamic acid derivatives such as methyldithiocarbamic acid, ethyldithiocarbamic acid, butyldithiocarbamic acid, phenyldithiocarbamic acid, allyldithiocarbamic acid, dimethyldithiocarbamic acid, diethyldithiocarbamic acid, dibutyldithiocarbamic acid, ethylphenyldithiocarbamic acid and dibenzyldithiocarbamic acid; dithiocarboxylic acid derivatives such as dithioformic acid, dithioacetic acid, dithiopropionic acid and dithiobenzoic acid; dithiocarbonic acid derivatives such as methylxanthogenic acid, ethylxanthogenic acid, propylxanthogenic acid and butylxanthogenic acid; 5-monosubstituted barbituric acids such as barbituric acid, methylbarbituric acid, ethylbarbituric acid, isobutylbarbituric acid, phenylbarbituric acid, benzylbarbituric acid and allylbarbituric acid; 5-disubstituted barbituric acids such as dimethylbarbituric acid, methylisopropylbarbituric acid, methylphenylbarbituric acid, diethylbarbituric acid, ethylisopropylbarbituric acid, ethyl-n-butylbarbituric acid, ethylphenylbarbituric acid, ethylcyclohexylbarbituric acid, di-n-propylbarbituric acid, isopropylallylbarbituric acid and diallylbarbituric acid; N-methylbarbituric acid derivatives such as N-methylbarbituric acid, 5-ethyl-n-methylbarbituric acid, 5,5-diethyl-N-methylbarbituric acid and 5-ethyl-5-phenyl-N-methylbarbituric acid; thiobarbituric acid derivatives such as 2-thiobarbituric acid, 5-ethyl-2-thiobarbituric acid, 5-phenyl-2-thiobarbituric acid, 5,5-diethyl-2-thiobarbituric acid and 5-ethyl-5-$\alpha$-methylbutyl-2-thiobarbituric acid; $\beta$-diketones such as acetylacetone, benzoylacetone, methylacetylacetone (another name; 3-methylpentane-2,4-dione), ethylacetylacetone, benzoylacetylacetone and 1,3-cyclohexanedione; $\beta$-keto esters such as methyl acetoacetate, ethyl acetoacetate, n-propyl acetoacetate, n-butyl acetoacetate, benzyl acetoacetate, ethyl methylacetoacetate (another name; ethyl 2-methyl-3-oxobutanoate), ethyl ethylacetoacetate, ethyl benzylacetoacetate, ethyl phenylacetoacetate, ethyl 2,3-trimethylene-3-oxobutanoate and ethyl 2,3-tetramethylene-3-oxobutanoate; $\beta$-diesters such as dimethyl malonate, diethyl malonate, di-n-butyl malonate and diphenyl malonate; and $\beta$-dicarbonyl compounds such as oxalacetic acid diesters (e.g. dimethyl oxalacetate, diethyl oxalacetate and diphenyl oxalacetate).

Among these curing catalyst, particularly preferred examples are one or more alkali metal salts selected from the lithium, sodium and potassium salts of thiocarbamic acid, dithiocarbamic acid, thiocarbonic acid, dithiocarbonic acid and their alkyl derivatives; barbituric acid, ethylbarbituric acid phenylbarbituric acid, dimethylbarbituric acid, diethylbarbituric acid, methylphenylbarbituric acid, ethylphenylbarbituric acid and their thio derivatives; acetylacetone, benzoylacetone, acetoacetic acid esters, malonic acid diesters, oxalacetic acid diesters and their derivatives having an alkyl substituent at the $\alpha$-carbon atom thereof.

The amount of the curing catalyst used in the present invention is 0.1 to 10 parts by weight, preferably 0.3 to 5 parts by weight, per 100 parts by weight, as calculated as $R_n^4SiO_{(4-n)/2}$ (wherein n and $R^4$ are as defined above), of the partially hydrolyzed product of alkoxysilane represented by the formula: $R_n^4Si(OR^5)_{4-n}$. When the amount of the curing catalyst used is below this range, the surface hardness of a coating film becomes poor; on the other hand, when it is beyond this range, a coating film tends to become poor in adhesion property and water resistance.

In the coating composition of the present invention composed mainly of the partially hydrolyzed product of alkoxysilane, an organic polymer such as an alkyl acrylate or alkyl methacrylate/hydroxyalkyl acrylate or hydroxyalkyl methacrylate copolymer or etherified methylolmelamine may be added in order to improve the physical properties, particularly, heat cycle resistance of the resulting coating film. Further, a surfactant may also be added for preventing the defects of the surface state of the resulting coating film such as orange peel and wrinkling as well as for preventing formation of fish eyes and pin holes of the coating film. Particularly, a good coating film can be formed by adding a small amount of an alkyleneoxide/dimethylsiloxane block copolymer.

In order to improve the utility of the coating composition of the present invention, ultraviolet absorbers, antistatic agents, anticlouding agents, antigelling agents, lubricants, dyes, pigments and fillers may further be added in the composition.

The coating composition can be prepared by dissolving or dispersing these components in a solvent according to conventional techniques.

The solvent used for the preparation of the coating composition includes, for example, alcohols, ketones, esters, ethers, cellosolves, halides, carboxylic acids and aromatic compounds. The choice of the solvent depends upon the substrates such as the polymers to be coated as well as the factors such as its evaporation rate. In practice, the proportion of the solvent to the other components of the coating composition will vary widely and the amount of the solvent depends upon the thickness of the desired coating film and the coating technique to be employed.

For applying the liquid coating composition in the present invention, any of the commonly employed coating techniques such as spray coating, dip coating, brush coating, roll coating and the like can be used. By coating the surface of a thermoplastic resin article with the composition and heating, the desired coating film having excellent properties such as good transparency and excellent abrasion resistance, hardness, chemical resistance and the like can be formed.

It is desirable to carry out coating at a temperature of 20°±3° C. and a relative humidity of not more than 60% in a dust-free clean air atmosphere in view of the transparency of the coated articles. The heating can be carried out at a fairly lower temperature than that in the conventional methods. Since the heating can be completed, for example, at 60° to 90° C. for 30 to 120 minutes, the coating composition is suitable for coating resins of low heat distortion temperature such as polymethyl methacrylate.

The following examples further illustrate the present invention in detail but are not to be construed to limit the scope thereof. In the examples, all the "parts" are by weight unless otherwise stated.

EXAMPLES 1 to 33

1. Preparation of a solution of the partially hydrolyzed product (component I) of tetraethoxysilane Tetraethoxysilane (70 parts) was dissolved in isopropyl alcohol (11 parts), a 0.05 N aqueous hydrochloric acid solution (19 parts) was further added, and then hydrolysis was carried out at room temperature with stirring. After reaction, the reaction solution was aged for more than 20 hours to obtain a solution of the partially hydrolyzed product. The solution obtained contained 20.2%, as calculated as $SiO_2$, of the partially hydrolyzed product of tetraethoxysilane.

2. Preparation of a solution of the partially hydrolyzed product (component II) of methyltriethoxysilane Isopropyl alcohol (33 parts) and methyltriethoxysilane (54 parts) were charged into a reactor equipped with a reflux condenser to prepare a solution. A 0.02 N aqueous hydrochloric acid solution (13 parts) was further added, and hydrolysis was carried out by heating the solution under reflux for 5 hours with stirring. After reaction, the reaction solution was cooled to room temperature to obtain a solution of the partially hydrolyzed product. The solution obtained contained 20.3%, as calculated as $CH_3SiO_{1.5}$, of the partially hydrolyzed product of methyltriethoxysilane.

3. Preparation of a solution of the partially hydrolyzed product (component III) of vinyltriethoxysilane A solution of the partially hydrolyzed product of vinyltriethoxysilane was obtained in the same manner as is in the above section 2 using 15 parts of isopropyl alcohol, 74 parts of vinyltriethoxysilane and 11 parts of a 0.02 N aqueous hydrochloric acid solution. The solution contained 20.2%, as calculated as $CH_2=CHSiO_{1.5}$, of the partially hydrolyzed product of vinyltriethoxysilane.

4. Preparation of the coating composition

The above-prepared solutions of the components I, II and III and the curing catalysts of the present invention were dissolved, in mixing ratios as shown in Tables 1 to 3, in a mixture of n-butyl alcohol (70 parts), acetic acid (10 parts) and a surface active agent (0.1 part). If necessary, a butyl acrylate/2-hydroxyethyl methacrylate copolymer (weight ratio of the components, 4:1) was dissolved in the solutions to obtain liquid coating compositions.

5. Coating and performance test for coated articles

A transparent polymethyl methacrylate extrusion plate of 3 mm in thickness (trade name, Metha-ace; produced by Tsutsunaka Plastic Co.) was washed with a neutral detergent and then thoroughly with water, and air dried. The above coating composition was applied onto the plate at 20° C. and at the humidity of 55%, and dried for curing at 75° C. for 1 hour in a hot-air drier.

The coated extrusion plate was tested for various performances. The results are shown in Tables 1 to 3.

(1) Appearance

The transparency and defects of each resulting coating film were visually evaluated.

(2) Adhesion property

Each coating film was cut into 100 checker-like squares, each of which being 1 $mm^2$ square, with a steel knife so that the cuts reached the substrate coated. Cellophane tape (produced by Sekisui Kagaku Kogyo Co.) was allowed to adhere to the coating film, and then strongly torn up at an angle of 90° against the coating film. The adhesion property was expressed by the number of the squares remaining untorn/100 squares.

(3) Abrasion resistance (a) Scratchability by steel wool

The coating film was rubbed with #000 steel wool to evaluate the degree of scratchability, and graded as follows:

A: Not scratched even by strong rubbing
B: Slightly scratched by strong rubbing
C: Scratched even by weak rubbing The grade of non-coated polymethyl methacrylate extrusion plate was C.

(b) Pencil hardness

The test was carried out by using a pencil hardness tester. Pencil hardness was expressed by a maximum pencil hardness giving no scratch under 1 kg load. The grade of non-coated polymethyl methacrylate extrusion plate was 5H.

(4) Hot water resistance

The coated plate was dipped in hot water (80° C.) for 1 hour, and subjected to the above tests for appearance and adhesion property of the coating film.

TABLE 1

| Example No. | Partially hydrolyzed product of alkoxysilane | | | Curing catalyst | | Additives Butyl acrylate/ 2-hydroxyethyl methacrylate copolymer (part) |
|---|---|---|---|---|---|---|
| | Component I (part) | Component II (part) | Component III (part) | Kind | (Part) | |
| 1 | 100 | — | — | Potassium thiocarbamate | 1 | 25 |
| 2 | 100 | — | — | Sodium ethylthiocarbamate | 1 | 30 |
| 3 | 70 | 30 | — | Sodium diethyldithiocarbamate | 1 | 30 |
| 4 | 50 | 50 | — | Sodium diethyldithiocarbamate | 1 | 20 |
| 5 | 30 | 70 | — | Potassium dibutyldithiocarbamate | 2 | 10 |
| 6 | — | 100 | — | Sodium dithiocarbamate | 2 | — |
| 7 | — | 100 | — | Sodium methylxanthogenate | 2 | — |
| 8 | 50 | — | 50 | Sodium ethylxanthogenate | 2 | 20 |
| 9 | — | 50 | 50 | Potassium ethylxanthogenate | 2 | — |
| 10 | — | — | 100 | Sodium thiocarbonate | 2 | — |
| 11 | — | — | 100 | Sodium dithiocarbonate | 2 | — |

| | | | Performance of coated articles | | | |
|---|---|---|---|---|---|---|
| | | | Abrasion resistance | | Hot water resistance | |
| Example No. | Appearance | Adhesion property | Scratch ability by steel wool | Pencil hardness | Appearance | Adhesion property |
| 1 | Good | 100/100 | A | 7H | Good | 100/100 |
| 2 | Good | 100/100 | A | 7H | Good | 100/100 |
| 3 | Good | 100/100 | A | 7H | Good | 100/100 |
| 4 | Good | 100/100 | A | 7H | Good | 100/100 |
| 5 | Good | 100/100 | A | 7H | Good | 100/100 |
| 6 | Good | 100/100 | A | 7H | Good | 100/100 |
| 7 | Good | 100/100 | A | 7H | Good | 100/100 |
| 8 | Good | 100/100 | A | 7H | Good | 100/100 |
| 9 | Good | 100/100 | A | 7H | Good | 100/100 |
| 10 | Good | 100/100 | A | 7H | Good | 100/100 |
| 11 | Good | 100/100 | A | 7H | Good | 100/100 |

TABLE 2

| Example No. | Partially hydrolyzed product of alkoxysilane | | | Curing catalyst | | Additives Butyl acrylate 2-hydroxyethyl methacrylate copolymer (part) |
|---|---|---|---|---|---|---|
| | Component I (part) | Component II (part) | Component III (part) | Kind | (Part) | |
| 12 | 100 | — | — | Sodium barbiturate | 1 | 25 |
| 13 | 100 | — | — | Sodium ethylbarbiturate | 1 | 30 |
| 14 | 70 | 30 | — | Sodium phenylbarbiturate | 1 | 30 |
| 15 | 50 | 50 | — | Sodium dimethylbarbiturate | 1 | 20 |
| 16 | 30 | 70 | — | Potassium dimethylbarbiturate | 2 | 10 |
| 17 | — | 100 | — | Sodium diethylbarbiturate | 2 | — |
| 18 | — | 100 | — | Potassium diethylbarbiturate | 2 | — |
| 19 | 50 | — | 50 | Sodium methylphenylbarbiturate | 2 | 20 |
| 20 | — | 50 | 50 | Sodium ethylphenylbarbiturate | 2 | — |
| 21 | — | — | 100 | Sodium 2-thiobarbiturate | 2 | — |
| 22 | — | — | 100 | Sodium 5-ethyl-5-α-methyl-butyl-2-thiobarbiturate | 2 | — |

Performance of coated articles

TABLE 2-continued

| Example No. | Appearance | Adhesion property | Abrasion resistance Scratch ability by steel wool | Pencil hardness | Hot water resistance Appearance | Adhesion property |
| --- | --- | --- | --- | --- | --- | --- |
| 12 | Good | 100/100 | A | 7H | Good | 100/100 |
| 13 | Good | 100/100 | A | 7H | Good | 100/100 |
| 14 | Good | 100/100 | A | 7H | Good | 100/100 |
| 15 | Good | 100/100 | A | 7H | Good | 100/100 |
| 16 | Good | 100/100 | A | 7H | Good | 100/100 |
| 17 | Good | 100/100 | A | 7H | Good | 100/100 |
| 18 | Good | 100/100 | A | 7H | Good | 100/100 |
| 19 | Good | 100/100 | A | 7H | Good | 100/100 |
| 20 | Good | 100/100 | A | 7H | Good | 100/100 |
| 21 | Good | 100/100 | A | 7H | Good | 100/100 |
| 22 | Good | 100/100 | A | 7H | Good | 100/100 |

TABLE 3

| Example No. | Partially hydrolyzed product of alkoxysilane Component I (part) | Component II (part) | Component III (part) | Curing catalyst Kind | (Part) | Additives Butyl acrylate/ 2-hydroxyethyl methacrylate copolymer (part) |
| --- | --- | --- | --- | --- | --- | --- |
| 23 | 100 | — | — | Sodium acetylacetonate | 1 | 25 |
| 24 | 100 | — | — | Sodium acetylacetonate | 1 | 30 |
| 25 | 70 | 30 | — | Sodium benzoylacetonate | 1 | 30 |
| 26 | 50 | 50 | — | Sodium ethylacetoacetate | 1 | 20 |
| 27 | 30 | 70 | — | Sodium ethylacetoacetate | 2 | 10 |
| 28 | — | 100 | — | Potassium methylacetoacetate | 2 | — |
| 29 | — | 100 | — | Sodium diethylmalonate | 2 | — |
| 30 | 50 | — | 50 | Potassium diethyloxalacetate | 2 | 20 |
| 31 | — | 50 | 50 | Sodium di-n-butyloxalacetate | 2 | — |
| 32 | — | — | 100 | Sodium ethyl methylacetoacetate | 2 | — |
| 33 | — | — | 100 | Sodium ethyl 2,3-tetra-methylene-3-oxobutanoate | 2 | — |

| Example No. | Performance of coated articles Appearance | Adhesion property | Abrasion resistance Scratch ability by steel wool | Pencil hardness | Hot water resistance Appearance | Adhesion property |
| --- | --- | --- | --- | --- | --- | --- |
| 23 | Good | 100/100 | A | 7H | Good | 100/100 |
| 24 | Good | 100/100 | A | 7H | Good | 100/100 |
| 25 | Good | 100/100 | A | 7H | Good | 100/100 |
| 26 | Good | 100/100 | A | 7H | Good | 100/100 |
| 27 | Good | 100/100 | A | 7H | Good | 100/100 |
| 28 | Good | 100/100 | A | 7H | Good | 100/100 |
| 29 | Good | 100/100 | A | 7H | Good | 100/100 |
| 30 | Good | 100/100 | A | 7H | Good | 100/100 |
| 31 | Good | 100/100 | A | 7H | Good | 100/100 |
| 32 | Good | 100/100 | A | 7H | Good | 100/100 |
| 33 | Good | 100/100 | A | 7H | Good | 100/100 |

COMPARATIVE EXAMPLES 1 TO 9

A coating test was carried out in the same manner as in Example 1 except that the curing catalyst and the amount thereof and the curing temperature were changed as shown in Table 4. The formulation of the coating composition and the test results are shown in table 4.

TABLE 4

| | Partially hydrolyzed product | Additives Butyl acrylate/ |

TABLE 4-continued

| Comparative example No. | of alkoxysilane Component I (part) | Component II (part) | Component III (part) | Curing catalyst Kind | (Part) | 2-hydroxyethyl methacrylate copolymer (part) | Curing temperature (°C.) |
|---|---|---|---|---|---|---|---|
| 1 | 100 | — | — | — | — | — | 75 |
| 2 | — | 100 | — | — | — | — | 75 |
| 3 | 50 | — | 50 | — | — | 20 | 75 |
| 4 | 50 | 50 | — | Sodium thiocyanate | 1 | — | 75 |
| 5 | 50 | 50 | — | Sodium acetate | 1 | — | 75 |
| 6 | 50 | 50 | — | Sodium tetraborate | 1 | 10 | 75 |
| 7 | 50 | 50 | — | Sodium thiocyanate | 1 | — | 90 |
| 8 | 50 | 50 | — | Sodium acetate | 1 | — | 80 |
| 9 | 50 | 50 | — | Sodium tetraborate | 1 | 10 | 80 |

| | Performance of coated articles | | | | | |
|---|---|---|---|---|---|---|
| | | | Abrasion resistance | | Hot water resistance | |
| Comparative example No. | Appearance | Adhesion property | Scratch-ability by steel wool | Pencil hardness | Appearance | Adhesion property |
| 1 | Good | 35/100 | C | Less than 5H | Cracking | 0/100 |
| 2 | Good | 20/100 | C | Less than 5H | Slight peeling-off | 0/100 |
| 3 | Good | 44/100 | C | Less than 5H | Good | 0/100 |
| 4 | Slight blushing | 100/100 | B | 6H | Cracking | 88/100 |
| 5 | Good | 100/100 | B | 6H | Cracking | 92/100 |
| 6 | Good | 100/100 | B | 6H | Good | 95/100 |
| 7 | Slight blushing | 100/100 | A | 7H | Cracking | 100/100 |
| 8 | Good | 100/100 | A | 7H | Cracking | 100/100 |
| 9 | Good | 100/100 | A | 6H | Good | 100/100 |

What is claimed is:

1. In a method for forming an abrasion-resistant coating film by heat-curing a coating composition on the surface of a substrate, said composition composed mainly of a partially hydrolyzed product of alkoxysilane represented by the formula:

$$R_n^4 Si(OR^5)_{4-n}$$

wherein n is an integer of 0 to 2; $R^4$ is alkyl having 1 to 6 carbon atoms, phenyl, allyl, vinyl, methacryloxy, methacryloxyalkyl, mercaptoalkyl, aminoalkyl, epoxyalkyl, epoxyalkyloxy, epoxyalkyloxyalkyl, tetrahydrofuryl or fluoroalkyl; and $R^5$ is alkyl having 1 to 4 carbon atoms, the improvement which comprises using as a curing catalyst at least one alkali metal salt selected from the group consisting of (A) alkali metal salts of thio-acids, dithio-acids and their derivatives represented by the formula:

$$X-\underset{\underset{S}{\|}}{C}-Y-M$$

wherein X is $-NR^1R^2$ or $R^3$; $R^1$ and $R^2$ are each hydrogen, alkyl having 1 to 4 carbon atoms, phenyl, benzyl or allyl; $R^3$ is hydrogen, alkyl having 1 to 4 carbon atoms, phenyl, benzyl or alkoxy having 1 to 6 carbon atoms; Y is oxygen or sulfur; and M is lithium, sodium or potassium;

(B) alkali metal salts of barbituric acid and its derivatives represented by the formula,

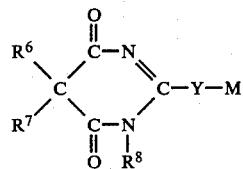

wherein $R^6$ and $R^7$ are each hydrogen, alkyl having 1 to 5 carbon atoms, phenyl, benzyl, allyl or cyclohexyl; $R^8$ is hydrogen or methyl; Y is oxygen or sulfur; and M is lithium, sodium or potassium and (C) alkali metal salt of a β-dicarbonyl compound represented by the formula:

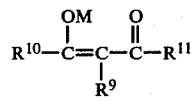

$$R^{10}-\underset{\underset{R^9}{|}}{C}=\overset{OM}{\underset{}{C}}-\overset{O}{\underset{}{\overset{\|}{C}}}-R^{11}$$

wherein $R^9$ is hydrogen, alkyl having 1 to 4 carbon atoms or alkylene having 3 to 4 carbon atoms; $R^{10}$ and $R^{11}$ are each alkyl, alkoxy having 1 to 4 carbon atoms, alkoxycarbonyl having 2 to 5 carbon atoms, phenyl, benzyl or alkylene having 3 to 4 carbon atoms; and M is lithium, sodium or potassium.

2. A method according to claim 1, wherein the curing catalyst is one or more alkali metal salts selected from lithium, sodium and potassium salts of thiocarbamic acid, dithiocarbamic acid, thiocarbonic acid, dithiocarbonic acid and their alkyl derivatives; barbituric acid, 5-alkylbarbituric acid, 5,5-dialkylbarbituric acid and their thio derivatives; acetylacetone, benzoylacetone, acetoacetic esters, malonic diesters, oxalacetic diesters and their derivatives having an alkyl substituent at the α-carbon atom.

3. A method according to claim 1, wherein the amount of the curing catalyst is 0.1 to 10 parts by weight per 100 parts by weight, calculated as $R_n^4SiO_{(4-n)/2}$ wherein n and $R^4$ are as defined in claim 1, of the partially hydrolyzed product of alkoxysilane represented by the formula: $R_n^4Si(OR^5)_{4-n}$ wherein n, $R^4$ and $R^5$ are as defined in claim 1.

4. A method according to claim 3, wherein the amount of the curing catalyst is 0.3 to 5 parts by weight.

* * * * *